Nov. 8, 1955 — G. A. WAHLMARK — 2,722,889
SERVO-TYPE CONTROL FOR PUMPS
Original Filed Dec. 17, 1945 — 4 Sheets-Sheet 2
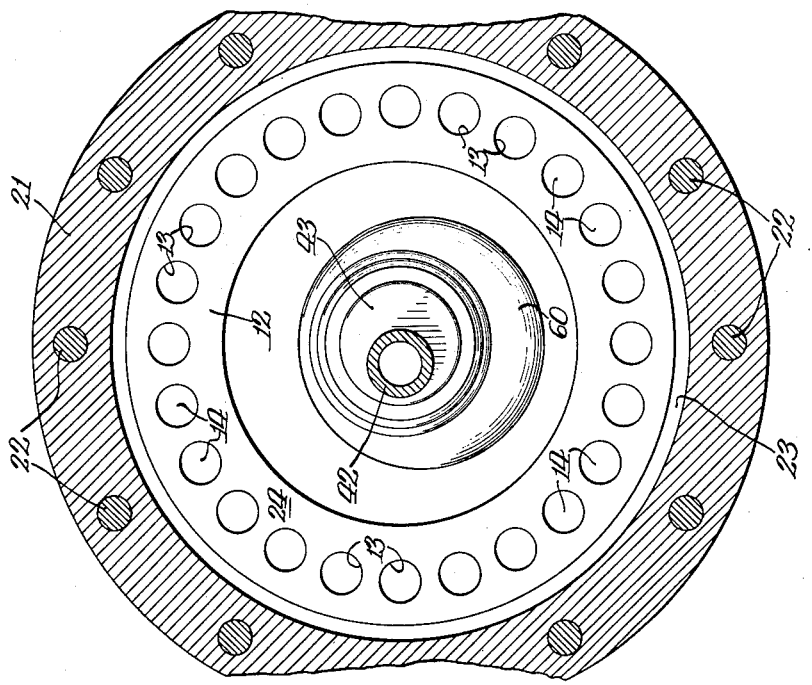
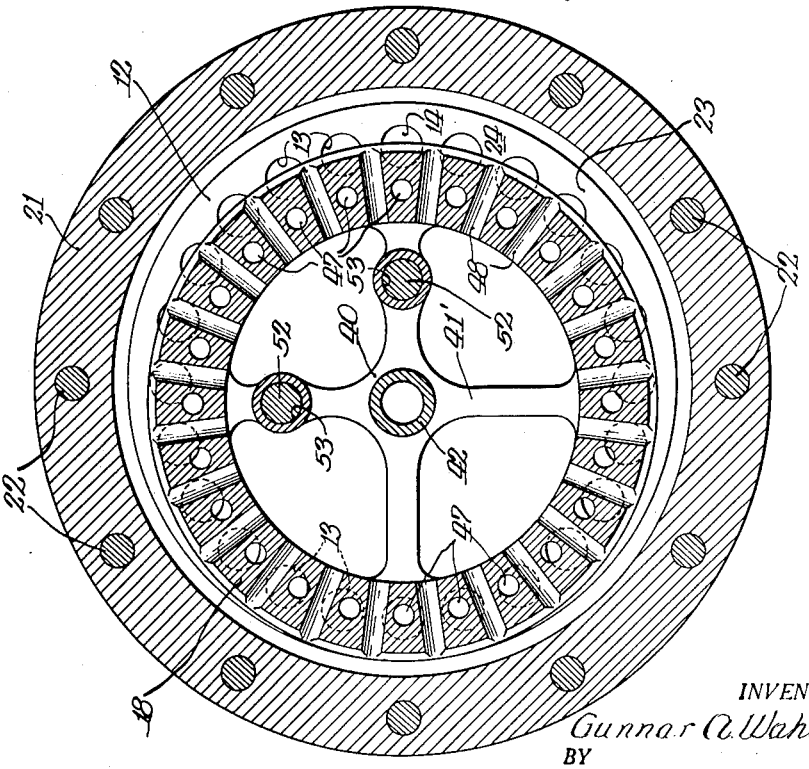
INVENTOR.
Gunnar A. Wahlmark
BY Christen, Schraeder, Merriam & Hofgren
his Attys.

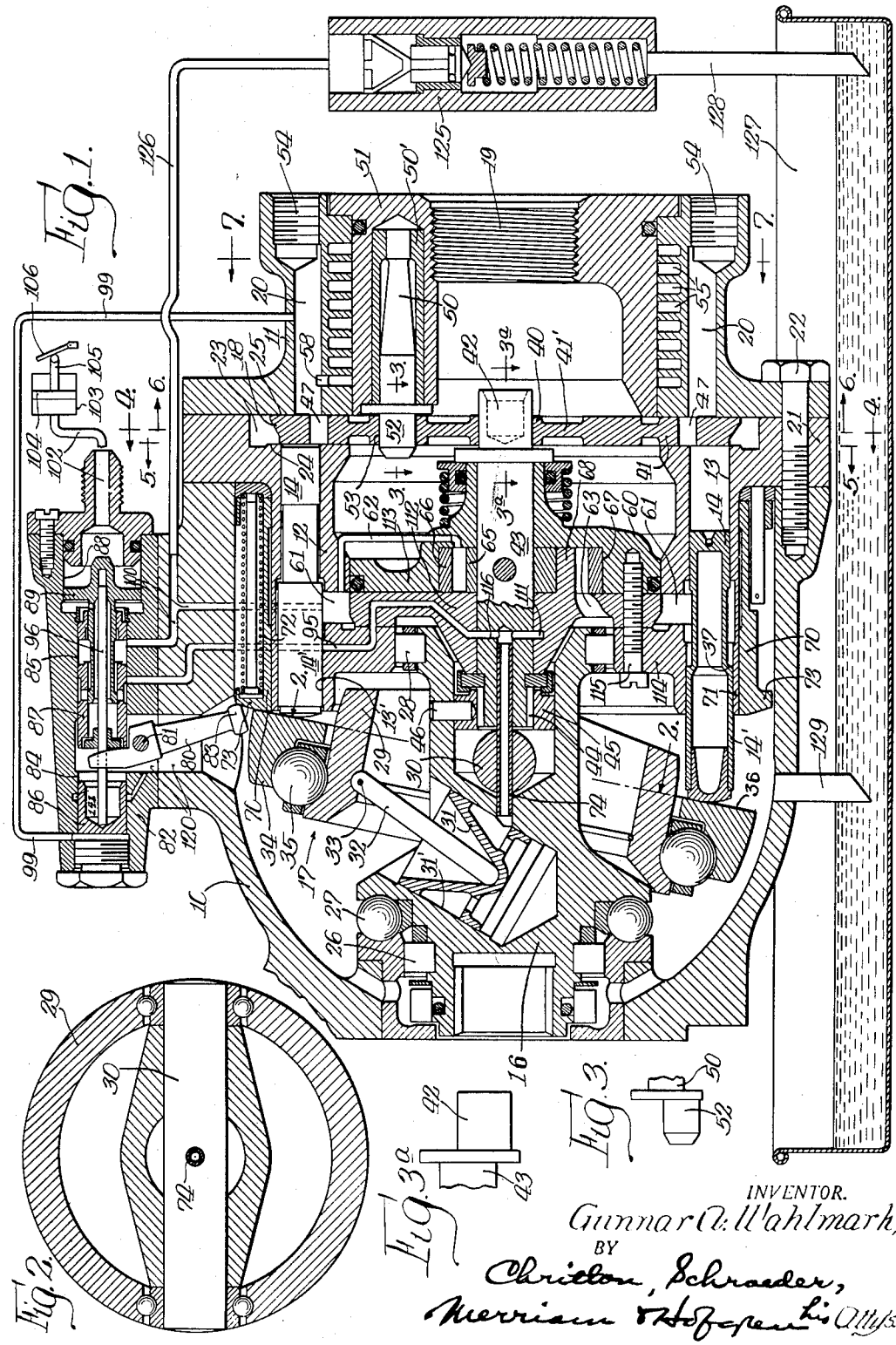

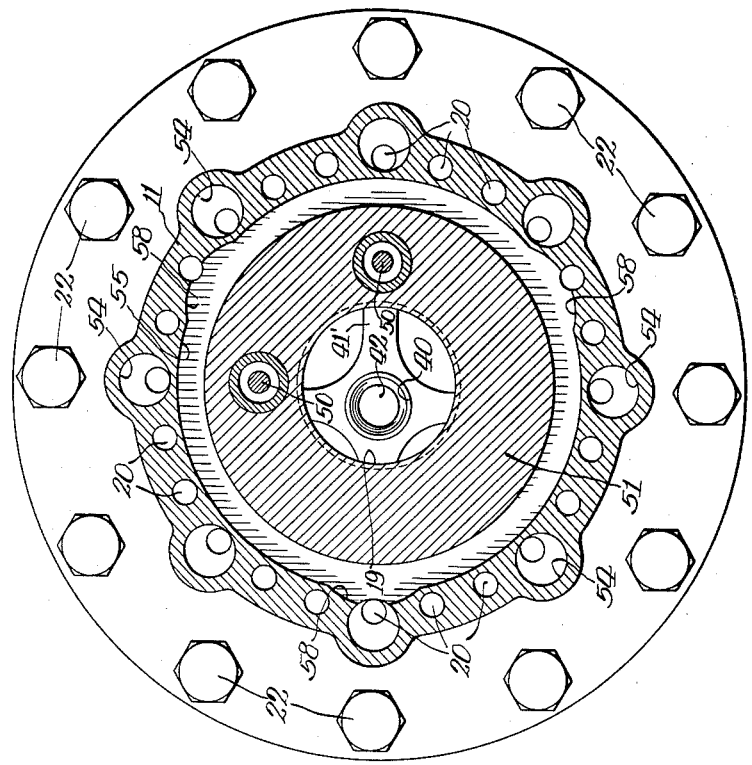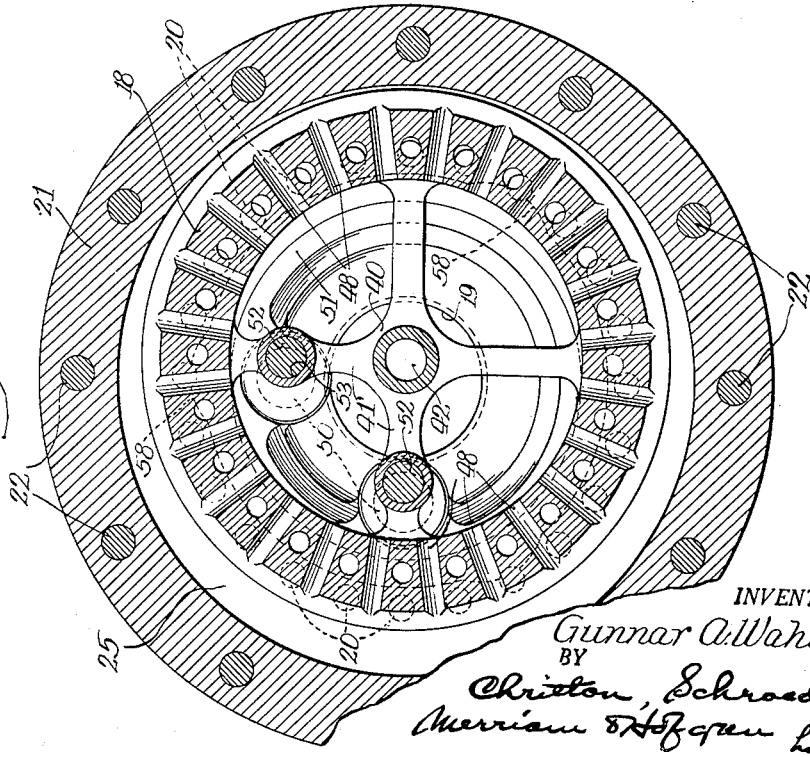

Nov. 8, 1955     G. A. WAHLMARK     2,722,889
SERVO-TYPE CONTROL FOR PUMPS
Original Filed Dec. 17, 1945     4 Sheets—Sheet 4
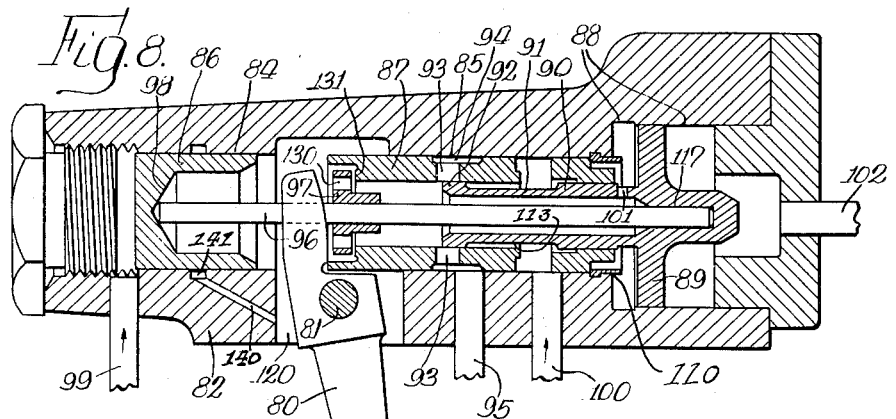
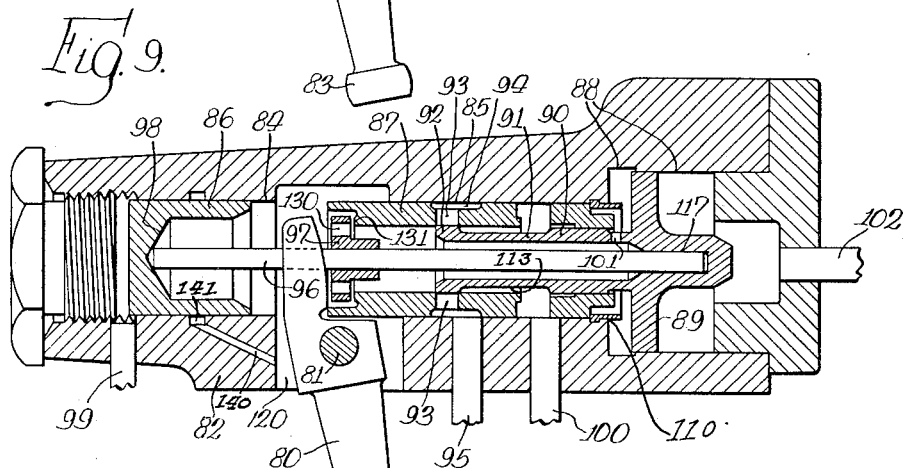
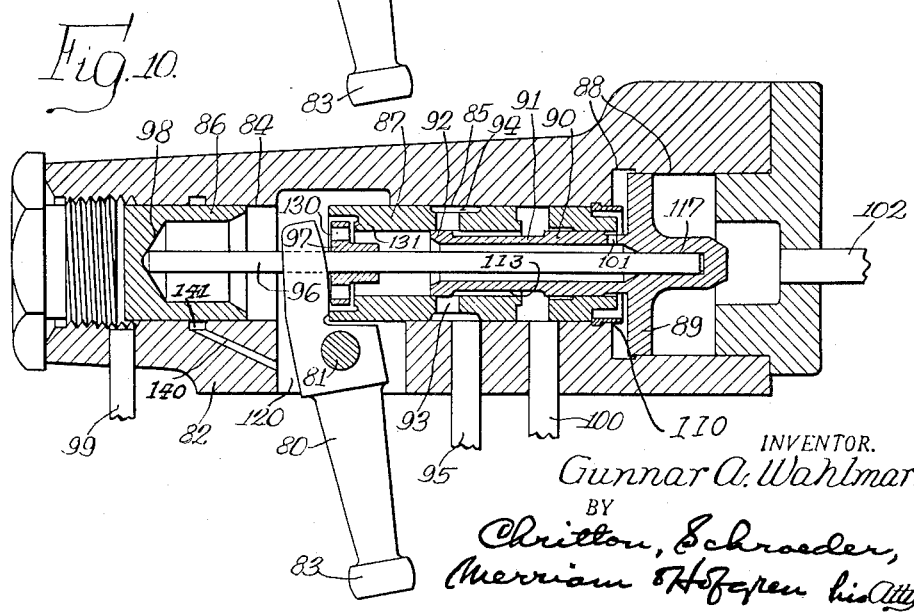
INVENTOR.
Gunnar A. Wahlmark,
BY
Chritton, Schroeder,
Merriam & Hofgren his Atty's.

United States Patent Office 2,722,889
Patented Nov. 8, 1955

2,722,889

SERVO-TYPE CONTROL FOR PUMPS

Gunnar A. Wahlmark, Rockford, Ill., assignor to Sundstrand Machine Tool Co., Rockford, Ill., a corporation of Illinois Original application December 17, 1945, Serial No. 635,455, now Patent No. 2,611,318, dated September 23, 1952. Divided and this application August 2, 1947, Serial No. 765,686

11 Claims. (Cl. 103—38)

This invention relates to a pump control, and more particularly to a servo type control for a variable displacement pump. It is the general object of the invention to provide a new and improved control of this type.

It is another object of the invention to provide a servo control for a variable displacement pump whereby the output pressure thereof may be accurately controlled.

It is a further object of the invention to provide in a servo valve of the type described means restricting the "hunting" of the valve with variations in output pressure.

Yet another object of the invention is to provide a servo valve for a variable displacement pump which permits accurate controlled variations in the output pressure and automatically maintains the output pressure at the desired level.

Other objects and advantages will become apparent from the following detailed description, which for purposes of disclosure, illustrates the servo control in conjunction with a variable displacement pump of the type disclosed and described in my copending application filed on December 17, 1945, as Ser. No. 635,455, now Patent No. 2,611,318 issued September 23, 1952, of which this application is a division. In the drawings:

Fig. 1 is a longitudinal central section through a preferred form of the invention;

Fig. 2 is a section approximately along the line 2—2 of Fig 1;

Fig. 3 is a fragmentary section along the line 3—3 of Fig. 1;

Fig. 3a is a fragmentary section along the line 3a—3a of Fig. 1.

Fig. 4 is a section along the line 4—4 of Fig. 1;

Fig. 5 is a fragmentary section along the line 5—5 of Fig. 1;

Fig. 6 is a fragmentary section along the line 6—6 of Fig. 1;

Fig. 7 is a section along the line 7—7 of Fig. 1;

Fig. 8 is an enlarged fragmentary section through the servo control with the parts positioned to effect a decrease in the output of the pump;

Fig. 9 is a similar view showing the parts in a position of equilibrium; and,

Fig. 10 is a similar view showing the parts in position to effect an increase in the output of the pump.

While the invention is susceptible of various modifications and alternative constructions, it is shown in the drawings and will hereinafter be described in a preferred embodiment. It is not intended, however, that the invention is to be limited thereby to the specific construction disclosed, but it is intended to cover all modifications and alternative constructions falling within the spirit and scope of the invention as defined in the appended claims.

As illustrated in the drawings, the pump comprises generally a holow casing having a somewhat tubular section 10 and an end section 11, a cylinder block 12 having a plurality of cylinder bores 13 in which pistons 14 are reciprocable, a drive shaft 16 rotatably mounted in the casing, a wobbler device 17 for converting rotary motion of the shaft into reciprocatory movement of the pistons, an annular plate-like valve 18 for controlling the flow of fluid to and from the cylinders, an inlet port 19 and a plurality of discharge ports 20, one for each of the cylinders 13.

The cylinder block 12 is generally annular in form and has an integral flange 21 positioned between the casing sections 10 and 11, the casing sections and flange being secured together by a plurality of screw devices 22. The cylinder block is provided with a cylindrical recess in its right hand end (Fig. 1) to form a cylindrical valve chamber 23 having opposed parallel faces 24 and 25. It is in this valve chamber and against these faces that the valve 18 is positioned.

The shaft 16 is rotatably mounted in the casing by means of a roller bearing 26 and a ball bearing 27 at the left hand end of the casing, and by means of a roller bearing 28 supported in the cylinder block 12. The wobbler device 17 comprises an inner ring member 29, which is pivotally mounted on the shaft 16 by means of a diametrically extending pin 30 (Figs. 1 and 2) and is operable by means of a piston 31 in a cylinder 31'. A piston rod 32 is connected by a pivot pin 33 to the inner ring 29 of the wobbler. The wobbler includes an outer ring 34 carried on the inner ring by means of a ball bearing 35, and arranged with a flat end face 36 in position to engage the adjacent convex ends of the pistons 14.

The pistons 14 have relatively large portions 14', which engage in larger portions 13' of the cylinder bores. This provides each piston with an annular surface 37 which functions in a manner hereinafter more fully described.

The flow of fluid to and from the cylinders 13 is controlled by the valve 18 which as illustrated in the drawings is a wheel-like member, having a hub portion 40, an annular rim 41, and a plurality of spokes 41'. The valve is positioned with its annular rim portion 41 in the cylindrical valve chamber 23 so as to be intermediate the adjacent ends of the cylinders 13 and the aligned discharge ports 20 opposite thereto. The valve is given a gyratory movement by means of an eccentric pin 42 which is carried on a shaft 43 positioned in axial alignment with the shaft 16 and connected thereto by means of multiple splines 44 and a ring 45 which is secured to the shaft 16 by a pin 46.

The valve 18 is provided with a plurality of ports 47, one for each cylinder 13, and so located in the annular or rim portion 41 of the valve that during operation thereof the ports 47 connect the cylinders 13 to the corresponding opposite discharge ports 20 in rotational sequence and alternatively the outer edge of the rim connects the cylinders 13 to the valve chamber 23 exteriorly of the valve 18, as shown for example in the right hand portion of Fig. 4. The main fluid handled by the pump is supplied to the outer portion of the valve chamber 23 from the inlet port 19 through a plurality of ports 48 (Fig. 4) which extend radially through the rim portion 41 of the valve. With the parts as illustrated in Fig. 4, fluid is thus being supplied to the right hand cylinders 13 and is being discharged from the left hand cylinders. The valve ports 47 are aligned with the cylinder ports and discharge ports when in their wide open positions.

In order to maintain the ports 47 of the valve continuously connected with the adjacent cylinders 13, means is provided for preventing substantial rotary movement of the valve 18 during operation of the pump. As illustrated in the drawings a pair of shafts 50 (Figs. 1, 3 and 6) are rotatably mounted in sleeves 50' secured in a bushing 51 secured within the casing section 11. The shafts 50 are parallel to the shaft 43 and spaced equidistantly therefrom above and to one side of the shaft 43 as shown in Figs. 6 and 7. These shafts 50 carry eccentric pins 52 which engage in bores 53 in the valve 18 spaced equi-distantly from the central bore 40. The pins 42 and 52 have the same eccentricity with respect to the shafts on which they are carried, with the result that the pins 52 serve as idlers to hold the valve 18 against rotary movement during the gyratory movement thereof.

In the form of the invention herein disclosed there are 24 cylinders 13 and 24 discharge ports 20. However, the pump has but 8 outlet ports 54, each one communicating with 3 of the discharge ports 20. The discharge ports 20 are connected in groups of 3 by means of annular passages 55 in the casing section 11, eight in number. Each of the annular passages is connected to three discharge ports, one hundred and twenty degrees apart, as shown in Figs. 1 and 7 by means of recesses 58. By connecting three equally separated discharge ports to each outlet port, pulsation of the fluid pressure at each outlet port is minimized over a wide range of speed.

During operation of the pump the pistons 14 are moved through their pressure strokes by means of the wobbler 17. To return the pistons through their suction strokes the annular surfaces 37 on the pistons serve as auxiliary pistons and are subjected to a fluid under pressure supplied from an auxiliary pump 60. The enlarged portions 13' of the cylinders are all connected together by means of an annular chamber 61 in the cylinder block 12. The auxiliary pump 60, which may be of a well-known rotary or gear type, has an outlet port 62 communicating with the chamber 61. An inlet port 63 for the auxiliary pump communicates with the interior of the casing section 10, which is kept filled with a lubricating fluid such as oil.

The auxiliary pump comprises casing members 112 and 113 which are secured to a transverse portion 114 of the cylinder block 21 by a plurality of screws 115. A pinion 65 is pinned on the shaft 43 and engages with an internal ring gear 66 located within a cylindrical chamber 67 in the casing of the pump. A crescent shaped member 68 is integral with casing member 112 and separates portions of the pinion and ring gear in a well-known manner.

For controlling the position of the wobbler plate 17 on the shaft 16 a tubular control member 70 is slidably mounted on a cylindrical surface 71 on the exterior of the cylinder block 12. A plurality of coiled springs 72 are positioned between an end flange 73 on the control member and the cylinder block, so as to urge the control member toward the left in Fig. 1 or toward a position placing the wobbler in neutral. Thus without a fluid under pressure acting on piston 31, the wobbler is maintained in neutral position by the control member 70. The movement of the wobbler from its neutral position is controlled by the pressure of the fluid admitted to the cylinder 31' through a tube 74 which extends axially through portions of the shafts 16 and 43, and which at its right hand end (Fig. 1) is supplied with fluid from the auxiliary pump 43 through intervening control means hereinafter more fully described.

Adjustment of the output volume of the pump is accomplished by adjusting the angular position of the wobbler 17 with respect to the axis of the shaft 16. This is accomplished by a novel servo type control mechanism of the type illustrated in Figs. 1 and 8 to 10. In this mechanism a lever 80 is pivotally supported at 81 on a casing 82 which houses the control and is secured to the pump casing 10. The lower end 83 of the lever 80 bears against the exposed end of the tubular control member 70 (Fig. 1). The upper end of the lever is forked or bifurcated.

The casing 82 has aligned bores 84 and 85 therein, positioned parallel to the shaft 16. A piston 86 is slidably mounted in the bore 84 and a sleeve valve 87 is slidable in the bore 85. The right hand end of the bore 85 communicates with a larger bore or cylinder 88. An opposed piston 89 is slidable in cylinder 88 and has a tubular stem 90 slidable in the sleeve 87 and through a bushing 110 fixed in the right hand end of the bore 85. A reduced portion 91 of the stem 90 extends into the sleeve 87 and carries a piston valve 92 which controls an annular series of ports 93 in the sleeve. Externally the sleeve 87 has an annular groove 94 which communicates in all of the positions of the sleeve with a passage 95 (Fig. 1) leading to an annular recess 111 in member 112. Radial ports 116 in shaft 43 connect the recess 111 at all times with the passage in tube 74 which leads to cylinder 31'. A rod 96 has a collar 97 thereon positioned adjacent the left hand end (Figs. 1 and 8 to 10) of the sleeve 87. At one end the rod 96 extends into a conical recess 98 in the adjacent end of the piston 86 and engages the bottom of said recess. The other end of rod 96 passes through a bore in the stem portion 91 and is pressed into a bore 117 in the piston 89.

The left hand end of the bore 84 is connected to a pump outlet port 20 by means of a passage 99 so that the piston 86 is at all times subjected on its left hand end to the output pressure of the pump. The right hand end of the bore 85 is connected by a passage 100 to the annular chamber 61 (to which the outlet of the make-up pump 60 is connected by passage 62) so that the right hand end of the sleeve 87 is at all times subjected to the constant pressure of that pump. The left hand end of sleeve 87 engages the upper bifurcated end of the lever 80. A plurality of radial ports 101 connects the left hand end of the bore 88 to the interior of tubular stem 90, which in turn communicates, by means of the opening through the sleeve 87 and a passage 120, with the pump casing 10 which serves as a tank or reservoir. A passage 102 connects the right hand end of cylinder bore 88 with a cylinder 103 of a pressure control device in the form of a piston 104 which is slidable in said cylinder and is actuable by a suitable connection 105 to an actuator 106.

For the purpose of maintaining a uniform pressure on the control fluid in the passage 100, a pressure control or relief valve 125 (Fig. 1) is connected to passage 100 by a conduit 126 and is connected to a reservoir 127 by a conduit 128. The pump casing 10 is also connected to the reservoir by a drain conduit 129. The showing however, is diagrammatic in that in operating the pump it is contemplated that the casing 10 will be substantially filled with an operating fluid, such as oil. Thus, if a supplementary reservoir 127 is used, it will be a closed reservoir if located below the pump, but may be an open reservoir if located at a suitable elevation alongside or above the pump. A drain 140 is provided in the casing 82 to drain off leakage fluid reaching an annular recess 141.

In operation, the servo control mechanism functions to adjust the angular position of the wobbler in accordance with the pressure in the passage 102. With the parts as shown in Fig. 9, they are in equilibrium with the ports 93 in sleeve 87 closed by the piston valve 92 (with the exception of a small amount of leakage past the valve). The control fluid in passage 95 is then trapped and maintained therein and holds the piston 31 and wobbler 17 in their adjusted positions. The piston 86 is continuously subjected to the pressure of the fluid discharged from the main pump and in the event this pressure rises, the piston 86 is moved to the right in the bore 84 and through the rod 96, forces the valve piston 92 to the right to a position as shown in Fig. 8. Fluid from the passage 95 and cylinder 31' is then permitted to discharge through ports 93 to the bore of sleeve 87 to the left of piston valve 92 and drain back into the pump casing 10. This release of pressure from the wobbler piston 31 permits the springs 72 to move the tubular control member 70 to the left (Fig. 1) and swing the wobbler to a reduced stroke position nearer neutral. This adjustment of the wobbler swings the lever 80 in a clockwise direction so that the upper bifurcated end thereof moves the sleeve 87 to the right until the ports 93 are closed by piston valve 92. During the time this takes place, the quantity of the fluid discharged from the pump is reduced and, therefore, the pressure thereof is reduced, so that piston 86 can move back to its original position of Fig. 9 under the influence of the pressure of the control fluid from passage 100 against the right hand end of sleeve 87. The lever 80 and other parts also return to the positions shown in Fig. 9.

When it is desired to increase the quantity of the fluid discharged by the main pump, the actuator 106 is moved to move piston 104 to the left. This causes a corresponding movement of piston 89 and piston valve 92, toward the left to a position as shown in Fig. 10. Control fluid from passage 100 can then pass to the port 93 by means of the space 113 between the valve and the sleeve, groove 94 and passage 93 to cylinder 31' and actuate piston 31 to increase the pump stroke, overcoming the springs 72. As control member 70 moves toward the right (Fig. 1), the lever 80 pivots counterclockwise under influence of the sleeve 87 which is moved towards the left (Fig. 10) by the control fluid until the valve 92 closes the ports 93 in the sleeve. The parts have then reached positions similar to those shown in Fig. 9 wherein they are in equilibrium.

The collar 97, which is fixed on the rod 96, is provided with a plurality of ports 130 to permit fluid to flow therethrough. This collar functions to prevent "flutter" or "hunting" of the servo valve mechanism and to limit the movement of the control 96 and the associated pistons 86 and 89 relatively to the bifurcated upper end of the lever 80. Thus, if the piston 89 is moved towards the left from the position shown in Fig. 9, such movement is limited by engagement of the collar 97 with the upper end of the lever 80, after which, the rate at which the control piston 104 may be moved is limited by the rate at which the control mechanism effects an adjustment of the wobbler. Similarly, when the control rod 96 is moved towards the right as a result of increased pressure on the piston 86, engagement of the collar with a shoulder 131 on the sleeve 87 limits the movement of the rod relatively to the sleeve.

To decrease the output of the main pump, the actuator 106 is moved to the right to move piston 104 to the right (Fig. 1) and thereby decrease the pressure in the passage 102. This permits the pressure on the piston 86 to move the pistons 86 and 89 toward the right and to uncover the ports 93, as shown in Fig. 8. Control fluid from passage 95 then passes through the ports 93, the interior of sleeve 87 and the passage 120 and permits the wobbler 17 to turn counterclockwise (Fig. 1) under action of the spring 72. The lever 80 then pivots in a clockwise direction (Fig. 8) and moves the sleeve 87 toward the right to close the ports 93 as the wobbler reaches its new position.

The servo valve shown also serves to maintain the wobbler in a predetermined position. Should the wobbler change its angular position with respect to the shaft 16 without immediately effecting the discharge pressure, the elements of the valve control function to return the wobbler to its original angular position. For example, should leakage occur in the piston and cylinder device 31 and 31' permitting the collar 70 to shift the wobbler toward neutral position, such shift will cause rotation of the member 80 about its pivot. Contact will then be established between the end of the member 80 and the left hand end of the sleeve 87 (as seen in Figs. 8 to 10) to slide the sleeve to the right from the position illustrated in Fig. 9 to the position shown in Fig. 10. Fluid under pressure will then be directed to the cylinder 31' from conduit 100, space 113, port 93 and conduit 95, to return the wobbler to its original angular position. Similarly, should such angular shift of the wobbler cause an immediate drop in discharge pressure existing in conduit 99, control force acting against the piston 89 will shift valve 92 to the left simultaneously with the movement of the sleeve to the right to open port 93 to a greater extent and thereby to cause a more rapid return of the wobbler to its original position.

The piston and cylinder device 104, 103, has been illustrated diagrammatically in Fig. 1 to represent a simple form of device for varying the pressure in the passage 102. As shown, the piston 104 is under control of the actuator or throttle 106. In practice, when using the invention as a means for supplying fuel to an aircraft engine, it is contemplated that the manual control of the actuator or throttle 106 will be modified by means interposed in the connection 105. For example, the throttle 106 may control the adjustment of a governor responsive to engine speeds and the governor, together with an altitude or air pressure operated device, function jointly to control the pressure in the passage 102.

I claim:

1. A pump having, in combination, an inlet and an outlet, pressure producing means interposed between the inlet and the outlet, movable means for varying the output of the pressure producing means, a fluid operated device for moving the output varying means, a member movable in accordance with movement of the output varying means, servo control means for adjusting the output pressure varying means comprising a pressure operated device responsive to the output pressure of the pressure producing means, an opposed pressure operated device responsive to a variable control force, a source of operating fluid under pressure, a valve for controlling the supply of operating fluid to said fluid operated device and movable with said pressure operated devices, and a casing having a port positioned to be opened and closed by said valve and mounted to be moved by said member in a follow-up manner with the valve.

2. A pump having, in combination, an inlet and an outlet, pressure producing means interposed between the inlet and outlet, movable means for varying the output of the pressure producing means, a fluid operated device for moving the output varying means, a member movable in accordance with movement of the output varying means, servo control means for controlling the output pressure varying means comprising a pressure operated device responsive to the output pressure of the pressure producing means, an opposed pressure operated device connected to the first device and responsive to a variable control force, a source of operating fluid under pressure, a valve for controlling the supply of operating fluid to said fluid operated device movable with said pressure operated devices, a casing having a port positioned to be opened and closed by said valve and mounted to be moved by said member in a follow-up manner with the valve.

3. A pump having, in combination, an inlet and an outlet, pressure producing means interposed between the inlet and outlet, movable means for varying the output of the pressure producing means, a fluid operated device for moving the output varying means, a member movable in accordance with movement of the output varying means, servo control means for adjusting the output pressure varying means comprising a first piston responsive to the output pressure of the pressure producing means, an opposed piston responsive to a variable control force, a rod connecting the pistons to move together, a source of operating fluid under pressure, a valve for controlling the supply of operating fluid to said fluid operated device movable with said pistons and a sleeve in which the valve operates having a port positioned to be opened and closed by said valve and mounted to be moved by said member in a follow-up manner with the valve.

4. In a pump having pressure producing means, a movable wobbler for adjusting the output of the pressure producing means, a fluid operated device connected to the wobbler for moving the same, a member movable in accordance with movement of the wobbler, a source of operating fluid under pressure, servo control means for controlling the wobbler including a first piston movable in response to variations in the output pressure of the pressure producing means, an opposed piston movable in response to variations in a control force, a rod connecting the pistons to move together, a valve for controlling the supply of operating fluid to said fluid operated device movable with said pistons, and a sleeve in which the valve operates having a port positioned to be opened and closed by said valve and mounted to be moved by said member in a follow-up manner with the valve.

5. In a pump having pressure producing means, a wobbler for adjusting the output of the pressure producing means, a fluid operated device connected to the wobbler for moving the same, a member movable in accordance with changes of position of the wobbler, a source of operating fluid under pressure, servo control means for controlling the wobbler comprising a first piston movable in response to variations in the output pressure of the pressure producing means, an opposed piston movable in response to variations in a control force, a rod connecting the pistons to move together, a valve for controlling the supply of operating fluid to said fluid operated device movable with said pistons, a sleeve in which the valve operates having a port positioned to be opened and closed by the valve and mounted to be moved by said member in a follow-up manner with said valve, and means biasing the wobbler toward neutral position, said member being movable with movement of the wobbler to cause movement of the sleeve in response to movement of the wobbler.

6. In a pump having pressure producing means, a wobbler for varying the output of the pressure producing means and servo control means for controlling the wobbler, means for maintaining the wobbler in a predetermined angular position at any setting of the servo valve comprising a piston and cylinder device connected to the wobbler for moving the same, a member movable in accordance with changes of position of the wobbler, a source of operating fluid under pressure, a casing having a bore therein, a valve slidable within the bore for controlling the supply of operating fluid to said piston and cylinder device, a sleeve in which the valve operates having a port positioned to be opened and closed by the valve and movable by said member, means biasing the wobbler toward neutral position, changes of position of the wobbler in a direction increasing the output of the pressure producing means causing movement of the member whereby to move the sleeve in a direction discharging fluid from said piston and cylinder device to permit the biasing means to move the wobbler in a direction reducing the output of the pressure producing means, and changes of position of the wobbler in a direction decreasing the output of the pressure producing means causing movement of the member whereby to move the sleeve in a direction directing operating fluid under pressure to the piston and cylinder device to move the wobbler in a direction increasing the output of the pressure producing means.

7. In a pump having pressure producing means and a wobbler for adjusting the output of the pressure producing means, control means for determining the position of the wobbler and for maintaining the wobbler in any predetermined position comprising a piston and cylinder device connected to the wobbler for moving the same, means biasing the wobbler toward neutral position, a member movable in accordance with changes of position of the wobbler, a first piston movable in response to variations in the output pressure of the pressure producing means, an opposed piston movable in response to variations in a control force, a rod connecting the pistons to move together, a source of operating fluid under pressure, a valve for controlling the supply of operating fluid to said piston and cylinder device movable with said pistons, and a sleeve in which the valve operates having a port positioned to be opened and closed by the valve and movable by said member, movement of the valve in one direction directing operating fluid under pressure to the piston and cylinder device to move the wobbler in a direction increasing the output of the pressure producing means, movement of the valve in the other direction discharging fluid from the piston and cylinder device to permit the biasing means to move the wobbler in a direction reducing the output of the pressure producing means, said member moving said sleeve in a follow-up manner with said movements of the valve, and changes of position of the wobbler in a direction increasing the output of the pressure producing means causing movement of the valve in a first direction while simultaneously moving the member to cause the sleeve to move in a direction opposite to the direction of movement of the valve thereby rapidly to discharge fluid from said piston and cylinder device to permit the biasing means to move the wobbler in a direction reducing the output of the pressure producing means, and changes of position of the wobbler in a direction decreasing the output of the pressure producing means causing movement of the valve in a second direction while simultaneously moving the member to cause movement of the sleeve in a direction opposite to the last mentioned movement of the valve thereby rapidly to direct operating fluid under pressure to the piston and cylinder device to cause the wobbler to move in a direction increasing the output of the pressure producing means.

8. A control device comprising a body having an inlet port, a discharge port and a controlled pressure port, a port for receiving a first control pressure signal, and a port for receiving a second control pressure signal, a movable member in said body for establishing and interrupting communication between said inlet port, said discharge port, and said controlled pressure port in different positions of said member, said member having a portion forming one wall of a pressure chamber within said body, said chamber being in communication with said first control pressure port, and means responsive to the pressure at said second control pressure port for biasing the movable member against the force of said first control pressure.

9. A variable displacement pump having displacement varying means including a first member adapted to be positioned in accordance with the displacement and having servo-motor means connected to said first member for positioning said member, means for supplying a variable fluid-pressure signal, means for supplying motive fluid, means for establishing fluid communication between the motive fluid supply means and the servo-motor means and including valve means operable to control the flow of motive fluid to the servo-motor means in response to changes in the difference between pump discharge pressure and the variable pressure signal, and means including a second member connected between said valve means and the first member for causing proportional movements of the first member and said valve means to promote stable operation of the valve means.

10. A variable displacement pump having displacement varying means including a first member adapted to be positioned in accordance with the displacement and having a hydraulic motor connected to said first member for positioning said member, means for supplying motive fluid, means including a control device for establishing fluid communication between the motive fluid supply means and the hydraulic motor, said control device comprising a casing, a ported bushing slidably disposed in said casing, a pilot valve slidably disposed in the bushing and operable to regulate the flow of motive fluid to the hydraulic motor in response to a variable fluid-pressure signal, means for supplying said variable fluid-pressure signal, means for biasing the pilot valve against the force exerted by said signal, and anti-hunting means including a second member connecting the bushing to the first member and to cause movements of said bushing to be proportional to movements of the first member.

11. A variable displacement pump having a discharge passageway and also having displacement varying means including a first member adapted to be positioned in accordance with the displacement, a hydraulic motor connected to said first member for positioning said member, means for supplying motive fluid, means including a control device establishing fluid communication between the motive fluid supply means and the hydraulic motor, said control device including a ported bushing, valve means slidably disposed in the bushing and operable to control the flow of motive fluid to the hydraulic motor in response to a variable pressure signal, means for supplying said variable fluid-pressure signal, and means including a conduit for communicating the pressure fluid in the discharge passageway to the valve means for biasing the valve means against the force of the variable pressure signal.

No references cited.